United States Patent [19]

Petrick et al.

[11] Patent Number: 5,668,375

[45] Date of Patent: Sep. 16, 1997

[54] FAST SCAN RESET FOR A LARGE AREA X-RAY DETECTOR

[75] Inventors: Scott W. Petrick, Sussex; Larry R. Skrenes, Hartland; Jean Claude Morvan, Milwaukee, all of Wis.

[73] Assignee: General Electric Company, Milwaukee, Wis.

[21] Appl. No.: 703,237

[22] Filed: Aug. 26, 1996

[51] Int. Cl.⁶ .................................................. G01T 1/24
[52] U.S. Cl. ........................... 250/370.09; 250/208.1; 378/98.8
[58] Field of Search ................ 250/370.09, 208.1; 378/98.8

[56] References Cited

U.S. PATENT DOCUMENTS

| | | |
|---|---|---|
| 4,827,145 | 5/1989 | Arques ................................. 378/98.8 |
| 4,945,243 | 7/1990 | Arques ............................. 250/370.09 X |
| 4,996,413 | 2/1991 | McDaniel et al. . |
| 5,041,888 | 8/1991 | Possin et al. . |
| 5,352,884 | 10/1994 | Petrick et al. .......................... 250/208.1 |
| 5,530,238 | 6/1996 | Meulenbrugge et al. ............. 250/208.1 |

Primary Examiner—Carolyn E. Fields
Assistant Examiner—Edward J. Glick
Attorney, Agent, or Firm—Quarles & Brady

[57] ABSTRACT

A large area solid state x-ray detector employs a plurality of cells arranged in rows and columns composed of photodiodes that are charged, exposed to x-rays which deplete their charge in proportion to the exposure, and then recharged to determine the amount of exposure. Fast scanning of the photodiodes consistent with the reduction of dark current effects is obtained without ghost images by employing a non-imaging scan following the imaging scan. The non-imaging scan employs a greater proportion of each scan duration for charge restoration than the imaging scan. In one embodiment simultaneous non-imaging recharging of the photodiodes is performed to substantially reduce this non-imaging time.

12 Claims, 3 Drawing Sheets

FAST SCAN RESET FOR A LARGE AREA X-RAY DETECTOR

FIELD OF THE INVENTION

The invention relates to x-ray detectors and in particular large area solid-state x-ray detectors.

BACKGROUND OF THE INVENTION

The first x-ray images were made by exposing photographic film to an area beam of x-ray radiation after it had passed through a patient. Photographic-type film is still the medium of choice for many radiographic procedures, particularly where high image resolution is required. The photographic film may be coupled with a phosphor screen which enhances the film sensitivity to x-ray radiation by converting the x-ray radiation into visible light.

Often, however, it will be necessary for a doctor to view an x-ray image in real-time while performing a procedure such as a cardiac catheterization. In these circumstances, the x-ray film is replaced with an image intensifier and a television camera. The x-ray, striking a phosphor screen at the front of the image intensifier, produces a faint light image which is intensified by the image intensifier and read by the television camera. The use of the image intensifier permits a lower dosage of x-rays commensurate with the need to continuously expose the patient to radiation while a real-time image is acquired.

In certain circumstances it is desirable to convert an x-ray image into a digital representation for processing by a computer. The digital representation of the image may be processed, for example, to enhance edges in the image. Certain techniques such as digital subtraction angiography require that two images, one taken with and one taken without a contrast agent injected into the patient, be subtracted from each other. This subtraction may be done easily with digitized images.

Digital images may be obtained by scanning conventional photographic film or by using a photostimulable phosphor plate which is exposed like film then taken to a reader to be scanned and digitized. Alternatively, the electrical signal output by the television camera on an image intensifier/television camera system may be converted directly to a digital signal through the use of a high speed analog to digital converter.

With improvements in the fabrication techniques for constructing large area integrated circuit arrays (such as are used in LCD-type computer displays) there has been considerable interest in constructing a large area solid state x-ray detector that provides a digital signal directly to processing equipment. One such detector design described in U.S. Pat. No. 4,996,413 issued Feb. 26, 1991 to the same assignee as that of the present invention and hereby incorporated by reference, employs an array of cells comprised of a photodiode and thin film transistor switch arranged in columns and rows beneath a phosphor. An intrinsic capacitance associated with each diode is first charged and then the array is exposed to x-rays. X-ray photons striking the phosphor produce light photons which then strike the photodiodes causing charge to be lost from their intrinsic capacitances. After a period of exposure, charge is restored to the photodiodes. The amount of charge restored to each photodiode indicates the x-ray dose received by each photodiode. An electrical signal indicating the restored charge is digitized and stored as a digital image.

In order to provide suitable spatial resolution, a large number of photodiodes are employed. The wiring necessary to connect each photodiode to the necessary charging and measuring circuitry is reduced by connecting the photodiodes to individually addressable columns and rows. Specifically each photodiode is connected through a solid state switch to a column conductor common to all the other photodiodes in a given column. The photodiodes may therefore share wiring by being read-out one at a time through time division multiplexing. Specifically, a single column conductor provides a charging current to all photodiodes in a given column and is connected to a separate measuring circuit for that column which can quantify the amount of charging current provided to the photodiodes of that column. Control terminals of the solid state switches, which when asserted allow current to flow to the photodiodes, are connected to row conductors common for all the diodes of a given row. Thus, after exposure of the photodiodes, the photodiode array may be scanned by selectively asserting one row conductor to charge all the photodiodes in a given row. Because only one photodiode of that row is connected to each column conductor, the amount of current flowing through the column conductor when a given row conductor is asserted is related to the recharging of a single photodiode. This process is repeated with each row conductor being successively asserted until each of the photodiodes is recharged and the amount of restoring charge required measured.

Attached to each column conductor, so as to measure the charge passing into the column conductor, is an integrator which integrates the current flowing into the column conductor over the time that each row is asserted to produce a total charge measurement. At the end of integration, prior to the charge measurement, the integrator must be allowed to "settle" for a short period of time to remove the effect of noise spikes caused by the switching of the solid state switches coupled to the column conductors by the crossing row and column conductors. After the charge measurement, the integrator must be reset prior to the next row being measured.

For a variety of reasons, it is desirable to reduce the amount of time required to scan the entire panel and acquire the x-ray image. For example, photodiode dark current will deplete the charge stored by the photodiode even in the absence of light. The larger the time between successive scans for a given row, the higher the contribution the dark current will be to the perceived signal. Furthermore, certain x-ray imaging applications require high image rate acquisition, which implies a high row rate and limits the amount of time that can be devoted to the assertion and signal integration of any given row. This time is further reduced by the need to stabilize and reset the integrator as described above.

As a result of the need for high row rates and required stabilization and reset times, the charge on the photodiodes, may not be fully restored. This unrestored charge creates a "ghost image" that is overlaid on the image obtained in the next scanning of the detector array. The magnitude of the ghost image can be reduced by increasing the recharging time during the scanning of each row, but this is undesirable as the row rate would be decreased and limit the frame rate at which images are obtained.

SUMMARY OF THE INVENTION

The present invention decreases the magnitude of the ghost image without substantially decreasing the row rate by performing a second resetting scan after image acquisition, in which the rows are fully scanned for a second time but the image is not acquired and the charge is not measured. Because the charge is not measured, the portion of the row scanning period that is devoted to recharging can be increased depending on the application, until it becomes equal to or even greater than the period of the row scan, significantly increasing the effectiveness of this scan in recharging the photodiodes.

Specifically, the present invention provides a large area x-ray detector producing repeated image signals at a frame rate and comprising a plurality of electrically-chargeable solid state cells arranged in rows and columns. Charge integrators are attached to the cells of each column to provide a reading of the total charge delivered to the cells of each column. Acquisition circuitry first acquires an image signal during a scan of each row of cells, one row at a time, at a row rate. The scanning includes the steps of charging the cells of the row for a first predetermined time period; measuring the total charge delivered to the cells of the row by means of the charge integrators; and resetting the charge integrators. After the image signal is obtained, the acquisition control circuitry resets the cells of the detector during a second scan of each of the rows, one row at a time, at the row rate. The resetting of each row includes the charging of the cells of the row for a second predetermined time period larger than the first predetermined time period.

Thus, it is one object of the invention to provide an efficient resetting of the photodiodes that can be employed when the row rate and row sequence are fixed in the hardware. The resetting is accomplished using a normal image acquisition scan except that the reset time is increased over that which could be used if an image were acquired.

In situations where the scanning circuitry permits multiple rows to be activated at one time, the acquisition control electronic circuitry may restore the charge of the cells of multiple rows of the detector simultaneously by charging the photodiodes of multiple rows for the second predetermined time period.

Thus, it is another object of the invention to provide a method of reducing the magnitude of the "ghost images" while minimizing the effect on frame rate by performing a second charging of the photodiodes of multiple rows at the same time during what is normally the period of scanning of a single row.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
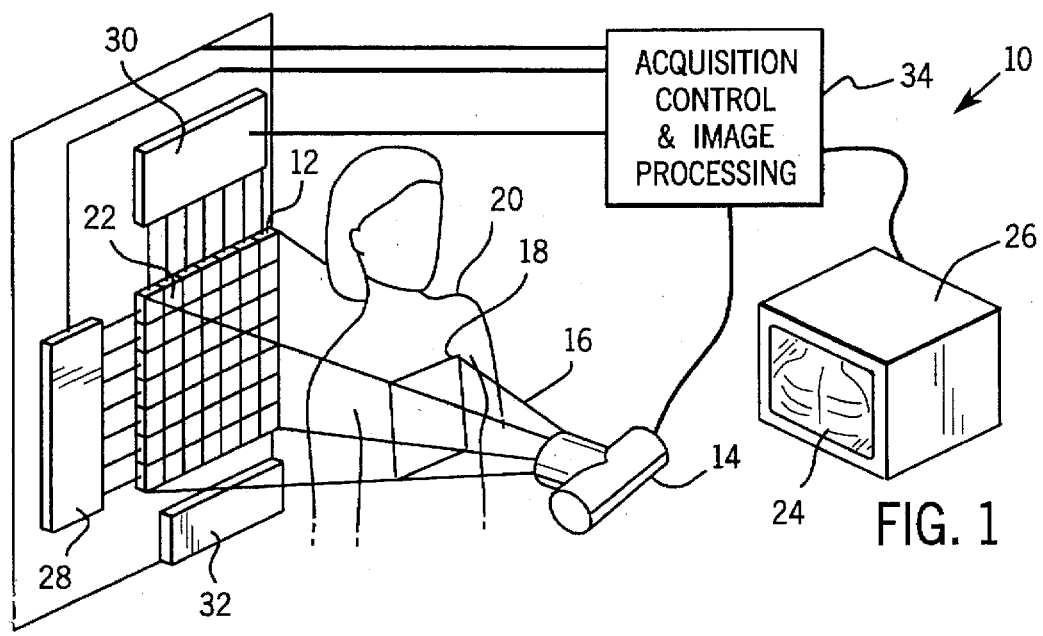
FIG. 1 is a perspective view showing the large area detector of the present invention as composed of rows and columns of detector cells in position to receive x-rays passing through a patient during an x-ray procedure.

Referring now to FIG. 1 an x-ray system 10 incorporating the array 12 of the present invention provides an x-ray tube 14 collimated to provide an area x-ray beam 16 passing through an area 18 of a patient 20. The beam 16 is attenuated along its many rays by the internal structure of the patient 20 to then be received by the detector area array 12 which extends generally over an area in a plane perpendicular to the axis of the x-ray beam 16.

The area array 12 is divided into a plurality of individual cells 22 arranged rectilinearly in columns and rows. As will be understood to those of ordinary skill in the art, the orientation of the columns and rows is arbitrary; however, for clarity of description, it will be assumed that the rows extend horizontally and the columns extend vertically.

As will be described in more detail below, during operation, the rows of cells 22 are scanned one at a time by scanning circuit 28 so that data from each cell 22 may be read by read-out circuit 30. Each cell 22 independently measures the intensity of radiation received at its surface and thus the data read out provides one pixel of information in an image 24 to be displayed on a monitor 26 normally viewed by a user.

A bias circuit 32 controls a bias voltage to the cells 22 as will be explained further below.

Each of the bias circuit 32, scanning circuit 28 and read-out circuit 30 communicate with an acquisition control and image processing circuit 34 which coordinates the operation of the circuits 30, 28 and 32 by means of an electronic processor (not shown). The acquisition control and image processing circuit 34 also controls the x-ray tube 14, turning it on and off and controlling the tube current and thus the fluence of x-rays in beam 16 and/or the tube voltage and hence the energy of the x-rays in beam 16.

The acquisition control and image processing circuit 34 also provides image data to the monitor 26 based on the data provided by each cell 22.

Figure 2:
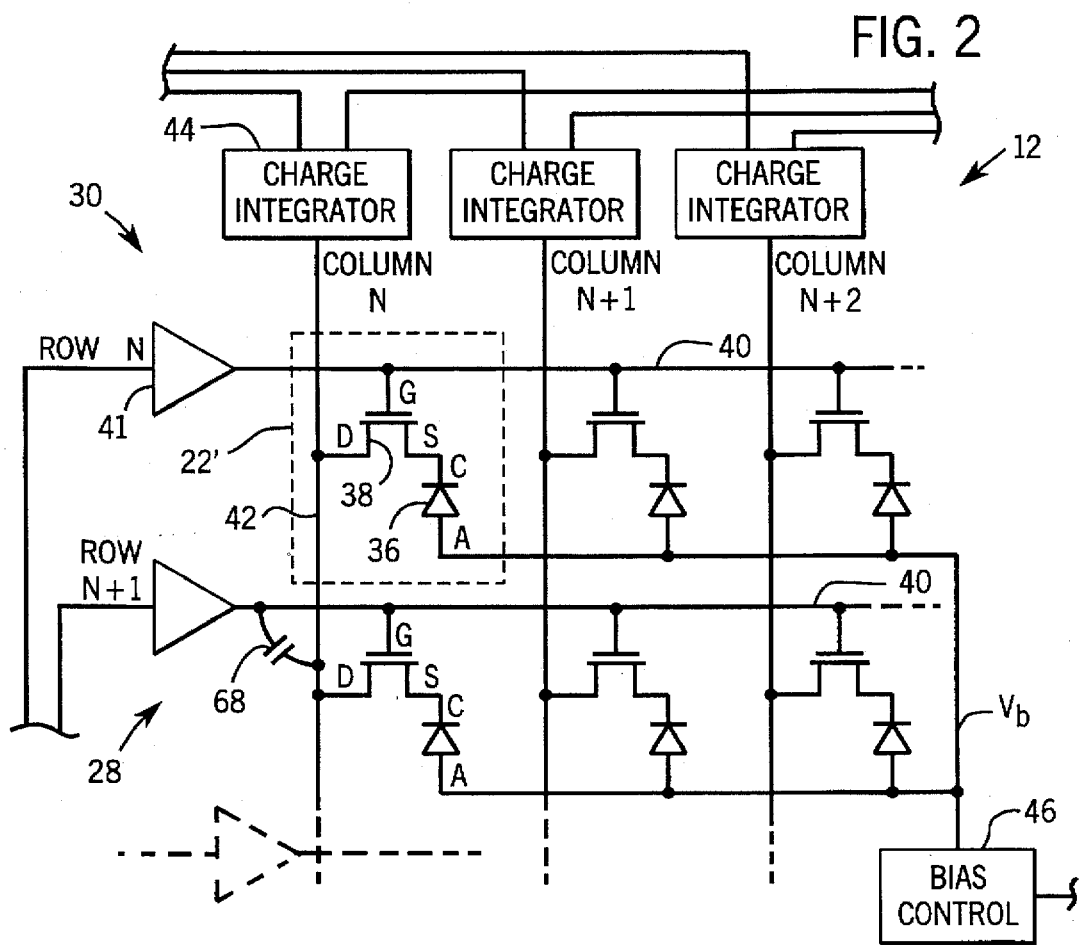
FIG. 2 is a fragmentary schematic of the detector of FIG. 1 showing six detector cells, each composed of a solid state switch and photodiode, the cells connected together in rows and columns with columns attached to charge integrators.

Referring now to FIG. 2, a given cell 22' of the array 12 includes a photodiode 36 having its cathode connected to the source of an FET 38. It will be understood to those of ordinary skill in the art that for many FET devices, the drain and source are interchangeable and hence the designation of either is solely in reference to the convention of the figures. The photodiode 36 may be fabricated on an amorphous silicon substrate so that the area of the photodiode 36 may substantially extend over the entire area of the cell 22'. The FET 38 may be a thin film transistor.

The drain of the FET 38 connects to a column conductor 42 which joins the drain of all FETs in cells in the same column as cell 22'. The column conductor 42 is connected to a charge integrator 44 which will be described in detail below but which provides an essentially constant reference voltage; to the cathode of the photodiode 36 when the FET 38 is on.

The anode of the photodiode 36 is connected to a bias control 46 which during normal operation imposes a negative voltage on the anode of the photodiode 36. Thus, when the FET 38 is conducting, the junction capacitance associated with the photodiode 36 will charge. No DC current flows, however, because the photodiode 36 is reversed biased.

The gate of the FET 38 is connected to a row conductor 40 which joins that gate to the gates of other FET's of other cells in the same row as cell 22'. The voltage at the gate of the FET 38 controls current flow between the drain and source of the FET 38 and thus the row conductor 40 serves to allow one signal to control the current flow through the FET of each cell in a row.

Each row conductor 40 connects to a driver 41 which is capable of maintaining the row conductor 40 in a high state at a voltage generally above the greater voltage on both the drain and source of the FET 38, or in a low state at a voltage generally below the lesser voltage upon the drain and source of the FET 38. Thus, when row conductor 40 is maintained in the high state current can flow through the FET 38 and when maintained in the low state no current flows through the FET 38.

Each cell 22 of the array 12 has a similar structure and is connected in the identical fashion described with respect to cell 22', with separate column conductors 42 and charge integrators 44 for each column of cells 22 and separate row conductors 40 and drivers 41 for each row of cells 22.

Figure 3:
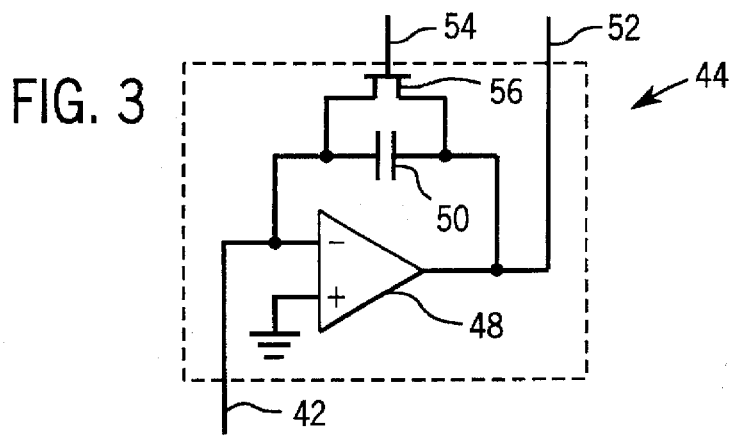
FIG. 3 is a schematic of the charge integrators of FIG. 2 showing its sensing, output and reset lines, the sensing lines attached to a column of detectors.

Referring now to FIGS. 2 and 3, the charge integrators 44 receive column conductors 42 at an inverting input of an operational amplifier 48 whose positive input is connected to the desired reference voltage for the column conductors 42. The operational amplifier 48 is selected to have high input impedance, low offset and low drift. The output of the operational amplifier 48 is connected through a reference capacitor 50 of known value to the inverting input of the operational amplifier 48. Current flowing from the output of the operational amplifier 48 to the column conductors 42 will charge capacitor 50. The voltage on capacitor 50 is therefore reflected as the output voltage 52 of the operational amplifier which represents the total charge conducted onto the column conductor 42 since the last time the integrator 44 was reset.

Resetting of the integrator 44 is accomplished by a reset signal on line 54 which turns on an FET 56 shunting capacitor 50 thus discharging capacitor 50 and returning the output 52 of the amplifier 48 to the reference voltage.

Figure 5:
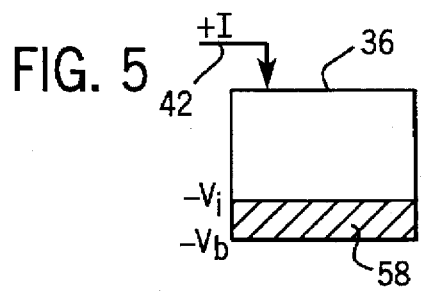
FIGS. 5 through 8 are graphic representations of the charging and discharging of the photodiode capacitance of an individual cell during an image acquisition, in which the charge restored after x-ray exposure is a measure of the exposure, showing the incomplete recharging of the capacitance under the constraints of a typical scan.
Figure 6:
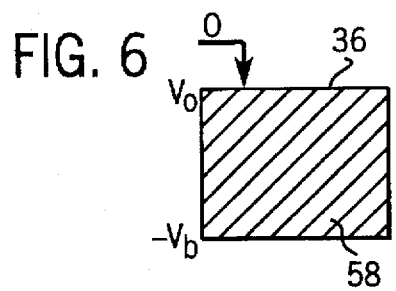
Figure 7:
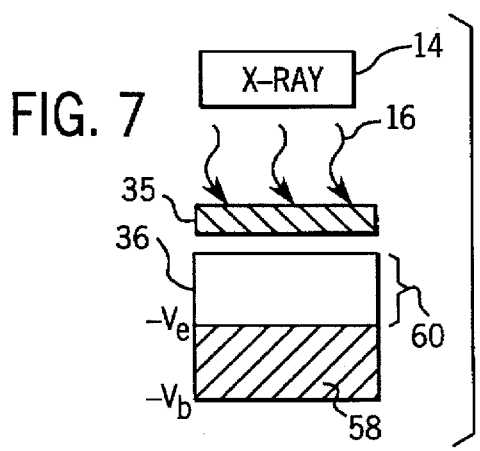

Referring now to FIG. 5, during operation of the array 12, the photodiode 36 for a given cell 22 will be charged by a current flowing on column conductor 42 to the photodiode 36 during the assertion of the row conductor 40 for that photodiode 36. After completion of the initial charging of the photodiode 36 as shown in FIG. 6, the voltage across the photodiode 36 will be near its maximum value of $V_0$ determined by the difference between the bias voltage and the reference voltage of the integrator As shown in FIG. 7, with the row conductor 40 deasserted, the radiation of a scintillator 35 positioned above the photodiode 36 by an x-ray beam 16 produces light photons which deplete the charge 58 on the photodiode 36 so that the voltage across the photodiode 36 drops to some exposure level $-V_e$.

Figure 8:
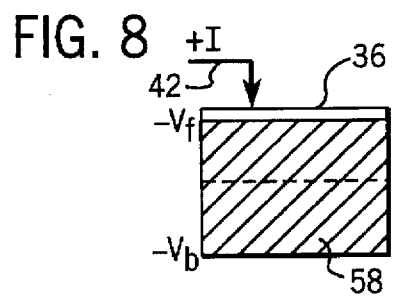

As shown in FIG. 8, the row conductor 40 is again asserted and the charge is restored on the photodiode 36 via the column conductor 42 by asserting the row conductor 40 associated with that photodiode 36 until the voltage rises to a final level $-V_f$. The amount of x-ray exposure thus will be the difference between $V_0$ and $-V_e$ indicated by distance 60 in FIG. 7, however the amount of charge measured will be the difference between $-V_e$ and $-V_f$.

In practice $-V_f$ will be somewhat lower than $V_0$ as a result of certain characteristics of the photodiodes 36 and the finite resistance of the FET 38 in the on state. The difference between $V_0$ and $V_f$, that is, the amount by which the charge 58 on the photodiode 36 is not completely restored, will, during the next exposure to x-rays, appear as an additional amount of x-ray exposure. As such the difference between $V_0$ and $V_f$ creates a charge restoration error in the next acquired image. Because the error caused by the difference between $V_0$ and $V_f$ is generally proportional to the signal level of the previous image, the error is generally reflected as a ghost image overlying the current image.

Figure 4:
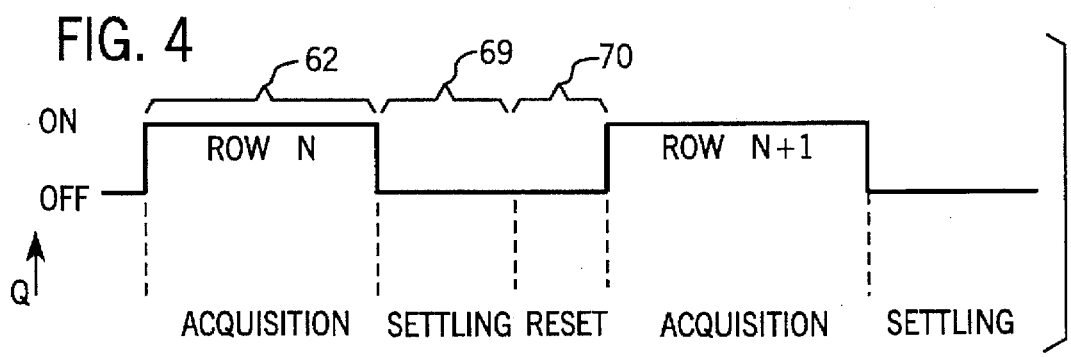
FIG. 4 is a timing diagram showing the relative timing in the assertion of row lines of FIG. 2 (for two different rows)

Referring now to FIGS. 2 and 4 this failure to fully recharge the photodiodes 36, is in part due to constraints on the amount of time that the row conductors 40 may be asserted during reading of each row. For a given row N conductor 40 will be asserted during an acquisition period 62. During the acquisition period 62 the FET 38 is turned on allowing current to flow through the FET 38 to recharge the photodiode 36. The output 52 of the integrator 44 rises to reflect the total charge flowing onto column conductor 42 to the photodiode 36. The general rise is interrupted by noise spikes which are caused in part by a parasitic coupling capacitance 68 (shown in FIG. 2) between the column conductors 42 and the row conductors 40. As a result of these spikes a settling time 69 is allowed to expire before the output signal 52 from the integrator 44 is read by the acquisition control and image processing circuit. 34 (shown in FIG. 1). At the conclusion of the reading of the output of the integrator 44, the integrator 44 is reset during period 70 by the assertion of the reset line 54 (shown in FIG. 3). This reset is required to occur before the acquisition of the next row because the charge integrators are shared by all cells 22 in a given column.

The sum of periods 62, 69 and 70 comprise the period of the row rate which is desirably fast so as to prevent dark currents from decreasing the charge on the photodiode 36. Within the short period of the row rate, the actual acquisition time 62 is further limited because of the need for an integrator settling and reset time prior to the acquisition of the next row.

Figure 9:
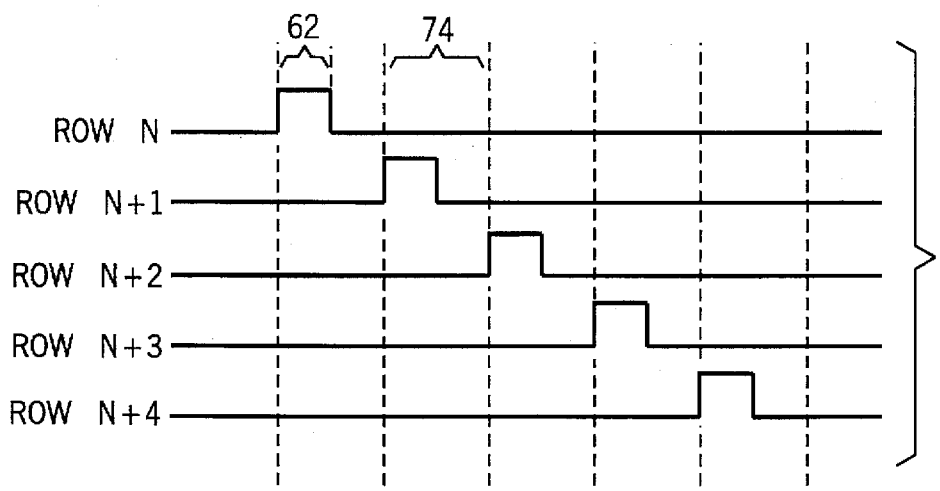
FIG. 9 is a plot showing the assertion of the row lines for the array of FIG. 1 during a typical image acquisition.

Referring now also to FIG. 9, each successive row conductor 40 for each row (N, N+1, N+2, etc.) is asserted in sequence for an acquisition period 62. As described above, during the acquisition period, the capacitance of the photodiodes 36 is recharged but not completely. As shown, only one row conductor 40 is asserted at a given time and the acquisition period 62 is only a portion of the row scan period 74. During each row period 74, after the acquisition period 62, exposure signals are received from each cell 22 of a row of the array 12.

Figure 10:
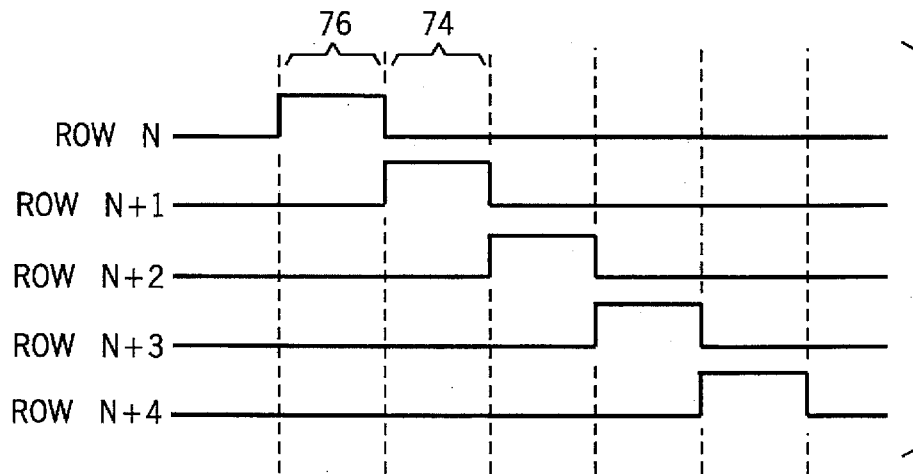
FIG. 10 is a figure similar to that of FIG. 9 showing the assertion of the row lines for a resetting scan per the present invention.

When a scan of each row is completed (i.e., each row conductor 40 for each row of the array 12 has been asserted once) the acquisition control and image processing circuit 34 scans each row for a second time in a reset scan as shown in FIG. 10 to reduce the photodiode charge restoration error. Here again the row conductors 40 are also asserted, one at a time, once during each row period 74 but for a time 76 greater than the acquisition assertion time 62, and up to the row period 74. This greater restoration time 76 is permissible because no exposure signal is read out and thus no settling time or reset time for the integrator 44 is required. In fact during this scan of FIG. 10 the reset line 54 may be continuously asserted so as to constantly reset the integrator 44 and prevent it from saturating. Referring momentarily to FIG. 8, the resetting scan of FIG. 10 brings the value of $V_f$ closer if not equal to the value of $V_o$ thus reducing any ghost image from subsequent scans.

At the conclusion of the resetting scan of FIG. 10, a second imaging scan per FIG. 9 may be obtained and then a subsequent resetting scan per FIG. 10 and so on.

In a second embodiment, where the acquisition control and image processing circuit 34 is sufficiently flexible to control the row conductors 40 in other than a sequential scan, multiple rows of conductors 40 may be simultaneously asserted after the imaging sequence of FIG. 9. This simultaneous assertion of the row conductors 40 again is only possible because no image is to be acquired, thus it is of no importance that the charges flowing to multiple diodes of given columns cannot be distinguished. Because, in the scan of FIG. 11, the photodiodes 36 of multiple rows may be recharged simultaneously, the recharging time for the entire array 12 is substantially reduced and may at the extreme occur during a single scan period 74.

This second embodiment is only limited by the constraints of the particular application that is being addressed. It will be apparent from this description that the number of rows asserted at one time can be varied between 1 and all rows; that the row assertion time can be stretched beyond the row scan period 74 either in whole or partial increments; and that these can be implemented individually or combined, either as a separate resetting scan or appended to every imaging scan.

Figure 11:
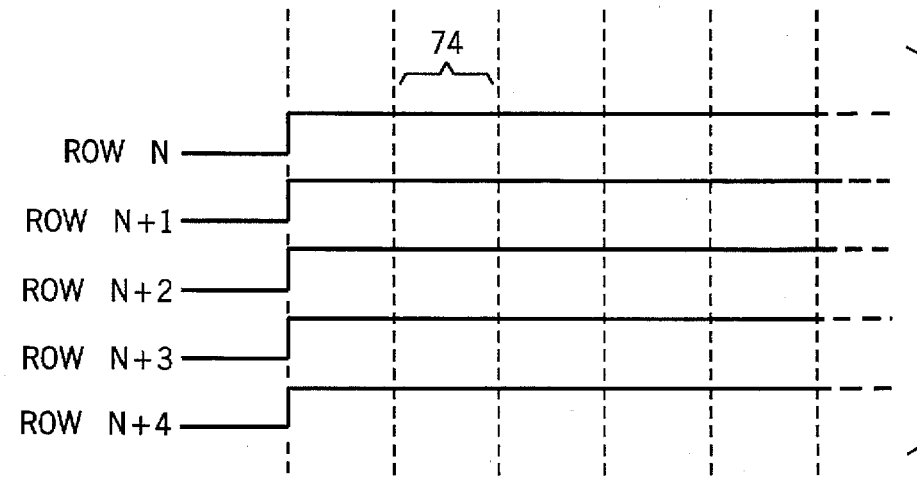
FIG. 11 is a figure similar to FIGS. 9 and 10 showing a parallel resetting of the cells of multiple rows of the detector array through simultaneous activation of the row lines, per the present invention.

Alternatively, however, the resetting scan of FIG. 11 may continue for several row periods 74 so as to provide a more complete recharging of the photodiodes 36. Such a prolonged resetting of the photodiodes 36 may be particularly useful where a low-exposure procedure immediately follows a high-exposure procedure, in which the high-exposure may have substantially depleted the charge from one or more photodiodes 36, causing the recharging during the imaging sequence to be substantially incomplete.

In order to apprise the public of the various embodiments that may fall within the scope of the invention, the following claims are made.

We claim:

1. An area x-ray detector producing repeated image signals at a frame rate comprising:
    (1) a plurality of electrically-chargeable solid state cells arranged in rows and columns;
    (2) charge integrators attached to the cells of each column to provide a reading of total charge delivered to the cells of each column;
    (3) acquisition control electronic circuitry programmed to:
        (a) acquire an image signal during a scan of each of the rows of cells, one row at a time, at a row rate, the scanning of each row including (i) charging the cells of the row for a first predetermined time period; (ii) measuring the total charge delivered to each cell of the row by means of the charge integrators; and (iii) resetting the charge integrators; and
        (b) restore the charge of cells of the detector during a scan of each of the rows of cells, one row at a time, at the row rate, the restoring of each row including charging the cells of the row for a second predetermined time period larger than the first predetermined time period.

2. The detector of claim 1 wherein the acquisition control electronic circuitry performs step (b) only after all rows have been scanned in step (a).

3. The detector of claim 1 wherein the second predetermined time period is no less than an entire period of the row rate.

4. The detector of claim 1 wherein each cell includes:
    (a) a photodiode;
    (b) a solid state switch having a first and second switch terminal and a control terminal, a signal at the control terminal controlling the current flow between the first and second switch terminals, wherein the second switch terminal is connected to the photodiode; and
    wherein column conductors electrically connect together the first terminals of the solid state switches to the charge integrators for each column; and
    wherein row conductors electrically connect together the control terminals of the solid state switches for each row; and
    wherein the acquisition control electronic circuitry charges the cells of the rows for the first and second predetermined time periods by asserting the row conductor of the row for the first and second predetermined time periods.

5. The detector of claim 4 wherein the photodiodes and solid state switches are constructed on a sheet of amorphous silicon.

6. An area x-ray detector producing repeated image signals at a frame rate comprising:
    (1) a plurality of electrically-chargeable solid state cells arranged in rows and columns;
    (2) charge integrators attached to the cells of each column to provide a reading of total charge delivered to the cells of each column;
    (3) acquisition control electronic circuitry programmed to
        (a) acquire an image signal during a scan of each of the rows of cells one row at a time at a row rate, the scanning of each row including (i) charging the cells of the row for a first predetermined time period (ii) measuring the total charge delivered to each cell of the row by means of the charge integrators; and (iii) resetting the charge integrators; and
        (b) restore the charge of a multiple of the cells of the detector simultaneously by charging the cells of a multiple of rows for a second predetermined time period.

7. The detector of claim 6 wherein the second predetermined time period is greater than the first predetermined time period.

8. The detector of claim 6 wherein the second predetermined time period is no less than an entire period of the row rate.

9. The detector of claim 6 wherein each cell includes
    (a) a photodiode;
    (b) a solid state switch having a first and second switch terminal and a control terminal, a signal at the control terminal controlling the current flow between the first and second switch terminals, wherein the second switch terminal is connected to the photodiode; and
    wherein column conductors electrically connect together the first terminals of the solid state switches to the charge integrators for each column; and wherein row conductors electrically connecting together the control terminals of the solid state switches for each row;

wherein the acquisition control electronic circuitry charges the cells of the rows for the first predetermined time periods by asserting the row conductor of the row; and wherein the acquisition control electronic circuitry charges the cells of multiple rows for the second predetermined time periods by asserting multiple row conductors at one time.

10. The detector of claim 9 wherein the photodiodes and solid state switches are constructed on a sheet of amorphous silicon.

11. A method of operating an area x-ray detector producing repeated image signals at a frame rate, the area x-ray detector including a plurality of electrically-chargeable solid state cells arranged in rows and columns with charge integrators attached to the cells of each column to provide a reading of total charge delivered to the cells of each column, the method comprising the steps of:

(a) acquiring an image signal during a scan of each of the rows of cells, one row at a time, at a row rate, the scanning of each row including (i) charging the cells of the row for a first predetermined time period; (ii) measuring the total charge delivered to each cell of the row by means of the charge integrators; and (iii) resetting the charge integrators; and (b) restoring the charge of cells of the detector during a scan of each of the rows of cells, one row at a time, at the row rate, the restoring of each row including charging the cells of the row for a second predetermined time period larger than the first predetermined time period.

12. A method of operating a large area x-ray detector producing repeated image signals at a frame rate, the area x-ray detector including a plurality of electrically-chargeable solid state cells arranged in rows and columns with charge integrators attached to the cells of each column to provide a reading of total charge delivered to the cells of each column, the method comprising the steps of:

a) acquiring an image signal during a scan of each of the rows of cells, one row at a time, at a row rate, the scanning of each row including (i) charging the cells of the row for a first predetermined time period; (ii) measuring the total charge delivered to each cell of the row by means of the charge integrators; and (iii) resetting the charge integrators; and b) restoring the charge of cells of the detector during a scan of multiple rows of cells, at one time, at the row rate; the restoring of multiple rows including charging the cells of multiple rows for a second predetermined time period.

* * * * *